United States Patent
Stupka

(10) Patent No.: US 10,186,898 B2
(45) Date of Patent: *Jan. 22, 2019

(54) CAPACITIVE POWER SYSTEM HAVING A SERVICE LIFE EXTENDING APPROACH

(71) Applicant: Honeywell International Inc., Morris Plains, NJ (US)

(72) Inventor: Radek Stupka, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 237 days.

This patent is subject to a terminal disclaimer.

(21) Appl. No.: 15/171,865

(22) Filed: Jun. 2, 2016

(65) Prior Publication Data
US 2016/0276868 A1    Sep. 22, 2016

Related U.S. Application Data

(63) Continuation of application No. 13/599,953, filed on Aug. 30, 2012, now Pat. No. 9,379,577.

(51) Int. Cl.
*H02J 3/00* (2006.01)
*H02J 9/00* (2006.01)
*H02J 7/34* (2006.01)

(52) U.S. Cl.
CPC ............ *H02J 9/00* (2013.01); *H02J 7/345* (2013.01); *Y10T 307/615* (2015.04)

(58) Field of Classification Search
CPC .......... H02J 7/345; Y10T 307/615; Y02J 9/00
(Continued)

(56) References Cited

U.S. PATENT DOCUMENTS 5,852,333 A * 12/1998 Strojny ............... H02J 9/061
                                                307/87
6,100,655 A * 8/2000 McIntosh ........... H02K 11/0073
                                                307/117
(Continued)

FOREIGN PATENT DOCUMENTS

| JP | 7007922 | 1/1995 |
|---|---|---|
| JP | 7222436 | 8/1995 |

(Continued)

OTHER PUBLICATIONS

Basu et al., "Voltage and Current Ripple Considerations for Improving Life Time of Supercapcitors Used for Energy Buffer Applications at Converter Inputs," EPE, ISBN: 9789075815009, 5 pages, 2009.

(Continued)

*Primary Examiner* — Rexford Barnie
*Assistant Examiner* — Toan Vu
(74) *Attorney, Agent, or Firm* — Seager, Tufte & Wickhem LLP

(57) ABSTRACT

A capacitive power system having a service life extending approach. The system may have an ultra or super capacitor with high capacitance. A predetermined amount of energy may be stored in the capacitor, sufficient for providing power to an electrically powered mechanism in the event the mechanism loses its power, to place it in a fail safe condition. With the capacitor at an initial capacitance, the working voltage may be set as low as possible while still retaining sufficient capacity for storing the predetermined amount of energy. As the capacitor's capacitance decreases with age, the working voltage of the capacitor may be gradually increased to compensate for lost capacitance. If the mechanism loses power, then a discharge of the capacitor may be initiated to transfer energy to the mechanism. If the electrical (Continued)

mechanism has power, then a charging of the capacitor may be initiated to transfer energy to the capacitor.

19 Claims, 8 Drawing Sheets

(58) Field of Classification Search
USPC .......................................................... 307/64
See application file for complete search history.

(56) References Cited

U.S. PATENT DOCUMENTS

| | | | |
|---|---|---|---|
| 6,362,598 B2 | 3/2002 | LaigHorstebrock et al. | |
| 6,947,855 B2 | 9/2005 | Verbrugge et al. | |
| 7,081,761 B2 | 7/2006 | Yurgil | |
| 7,206,705 B2 | 4/2007 | Hein | |
| 7,427,450 B2 | 9/2008 | Raiser | |
| 7,451,348 B2 | 11/2008 | Pecone et al. | |
| 8,024,038 B2 | 9/2011 | James et al. | |
| 8,499,708 B2 | 8/2013 | Roodenburg et al. | |
| 8,521,459 B2 | 8/2013 | Watanabe et al. | |
| 8,886,363 B2 | 11/2014 | Matthews et al. | |
| 2007/0033433 A1* | 2/2007 | Pecone ................... | G06F 1/305 714/6.13 |
| 2009/0195220 A1 | 8/2009 | Zhong et al. | |
| 2009/0208817 A1 | 8/2009 | Froeschl et al. | |
| 2010/0259210 A1 | 10/2010 | Sasaki et al. | |
| 2011/0100279 A1* | 5/2011 | Roodenburg .......... | B63B 39/00 114/122 |
| 2011/0125436 A1* | 5/2011 | Watanabe .......... | G01R 31/3679 702/65 |
| 2012/0197452 A1* | 8/2012 | Matthews ............... | H02J 3/008 700/292 |
| 2014/0062200 A1 | 3/2014 | Stupka | |

FOREIGN PATENT DOCUMENTS

| | | |
|---|---|---|
| JP | 10256489 | 9/1998 |
| JP | 11356036 | 12/1999 |
| JP | 2005168261 | 6/2005 |
| JP | 2007057368 | 3/2007 |
| JP | 2010286426 | 12/2010 |
| JP | 2011097683 | 5/2011 |
| WO | WO 00/351556 | 6/2000 |

OTHER PUBLICATIONS

Belimo, "CM Actuators with Supercap Module. For Extreme Conditions," 2 pages, prior to Aug. 30, 2012.
Carp et al., "Testing and Characterization of Aqueous Stacked Supercapacitors," Bulletin of the Transilvania University of Brasov, vol. 2, No. 51, pp. 243-248, 2009.
CDE Cornell Dubilier, "Type EDL Electric Double Layer Supercapcitors," 8 pages, prior to Aug. 30, 2012.
Cooper Bussman, "Cooper PowrStor Application Guidelines," 5 pages, Mar. 2007.
Diab et al., "Comparison of the Different Circuits Used for Balancing the Voltage of Supercapcitors: Studying Performance and Lifetime of Supercapcitors," hal-00411482, Version 1, 6 pages, Aug. 27, 2009.
Hadartz et al., "Battery-Supercapacitor Energy Storage, Master of Science Thesis in Electrical Engineering," 117 pages, 2008.
JS Humidifiers plc document, 6 pages, prior to Aug. 30, 2012.
Linzen et al., "Analysis and Evaluation of Charge-Balancing Circuits on Performance, Reliability, and Lifetime of Supercapcitor Systems," IEEE Transactions on Industry Applications, vol. 41, No. 5, pp. 1135-1141, Sep./Oct. 2005.
Metso, Valvcon ESR—Series Electronic Spring Return Electric Actuator, 6 pages, Technical Bulletin, May 2011.
Namisnyk et al, "A Survey of Electrochemical Supercapacitor Technology," 6 pages, prior to Aug. 30, 2012.
Namisnyk, "A Survey of Electrochemical Supercapcitor Technology," 122 pages, Jun. 23, 2003.
Nelson Controls Document, 43 pages, prior to Aug. 30, 2012.
Neptronic, "Acuator Selection Guide, Price List," 70 pages, Jul. 1, 2008.
Paul et al., "Constant Power Cycling for Accelerated Ageing of Supercapacitors," hal-00475769, Version 1, 10 pages, Apr. 23, 2010.
www.valve-world.net, "Electric Actuators for Control Valves," 1 page, Sep. 2008.

* cited by examiner

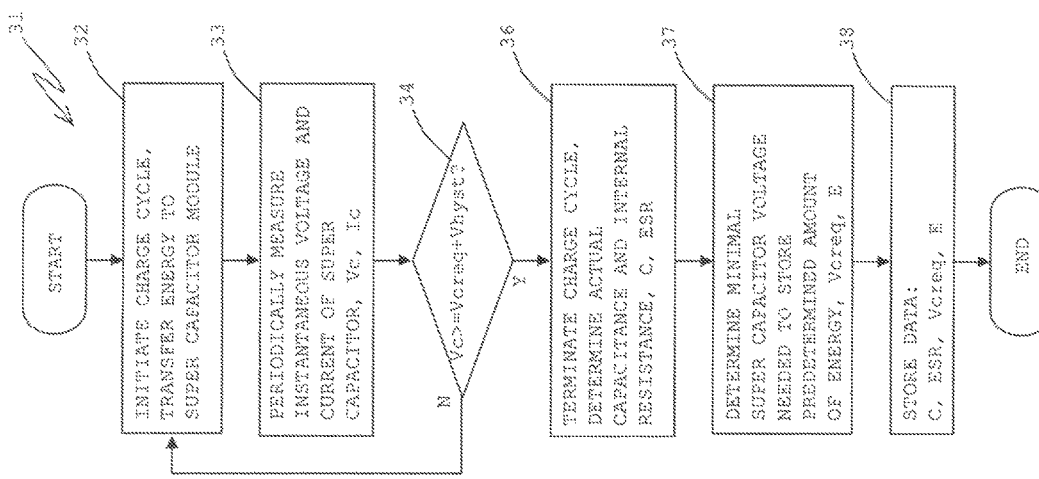

CAPACITIVE POWER SYSTEM HAVING A SERVICE LIFE EXTENDING APPROACH

This present application is a Continuation of U.S. patent application Ser. No. 13/599,953, filed Aug. 30, 2012. U.S. patent application Ser. No. 13/599,953, filed Aug. 30, 2012, is hereby incorporated by reference.

BACKGROUND

The present disclosure pertains to energy storage and particularly to capacitive energy storage. More particularly, the disclosure pertains to energy storage for operating electrical mechanisms.

SUMMARY

The disclosure reveals a capacitive power system having a service life extending approach. The system may have an ultra or super capacitor with high capacitance. A predetermined amount of energy may be stored in the capacitor, sufficient for providing power to an electrically powered mechanism in the event the mechanism loses its power, to place it in a fail safe condition. With the capacitor at an initial capacitance, the working voltage may be set as low as possible while still retaining sufficient capacity for storing the predetermined amount of energy. As the capacitor's capacitance decreases with age, the working voltage of the capacitor may be gradually increased to compensate for lost capacitance, for extending the service life of the capacitor. If the mechanism loses power, then a discharge of the capacitor may be initiated to transfer energy to the mechanism. If the electrical mechanism has power, then a charging of the capacitor may be initiated to transfer energy to the capacitor.

BRIEF DESCRIPTION OF THE DRAWING

FIGS. 7 and 8 are flow diagrams of discharge and charge cycles relating to the capacitor backup system.

DESCRIPTION

In building automation there may be actuator applications requiring a fail safe behavior. In the case of a power interruption, an actuator controlling a flap or a valve may need to be able to reach a certain fail safe position. Previously, the fail safe feature was generally assured by a mechanical spring within the actuator gear box. During normal operation, actuator motor not only would work against an ordinary load, e.g., a damper flap or valve, but it would have to increase tension in the spring. Mechanical energy stored in the spring was meant to be used during a power interruption to move the actuator damper flap or valve back to a safe position. That approach appeared to have a disadvantage of a need for a bigger motor and gears since the actuator motor had to perform against a nominal load of the damper or valve plus a load of the fail safe spring.

An approach to the issue may be introduced. The mechanical spring may be replaced by electric energy storage. Recent developments in electric or electrolytic double layer capacitor technology may allow the use of an electrically powered component in an actuator fail safe application. An electric or electrolytic double layer capacitor, also known as a super capacitor or ultra capacitor, may feature very high capacitance in the Farad range within a small sized component (e.g., not greater than one inch in diameter and two and one-half inches in length).

The present system may have an ultra or super capacitor having a capacitance value of one or more Farads. A predetermined amount of energy may be stored in the capacitor. This amount of energy may be sufficient for providing power to an electrically powered mechanism in the event that the mechanism loses its supply of power for normal operation. Upon a loss of power, the mechanism may need additional power to place the mechanism in a fail safe condition. The power may be regarded as a predetermined amount of energy sufficient for placing the mechanism in the fail safe condition. The predetermined amount of energy may be provided by the high capacity, ultra or super capacitor. The term "capacitor" in this description may refer to a high capacity, ultra or super capacitor, and the like, unless indicated otherwise, and these terms may be used interchangeably.

The present system and approach, as described herein and/or shown in the Figures, may incorporate one or more processors, computers, controllers, user interfaces, wireless and/or wire connections, and/or the like, wherever desired.

Figure 1:
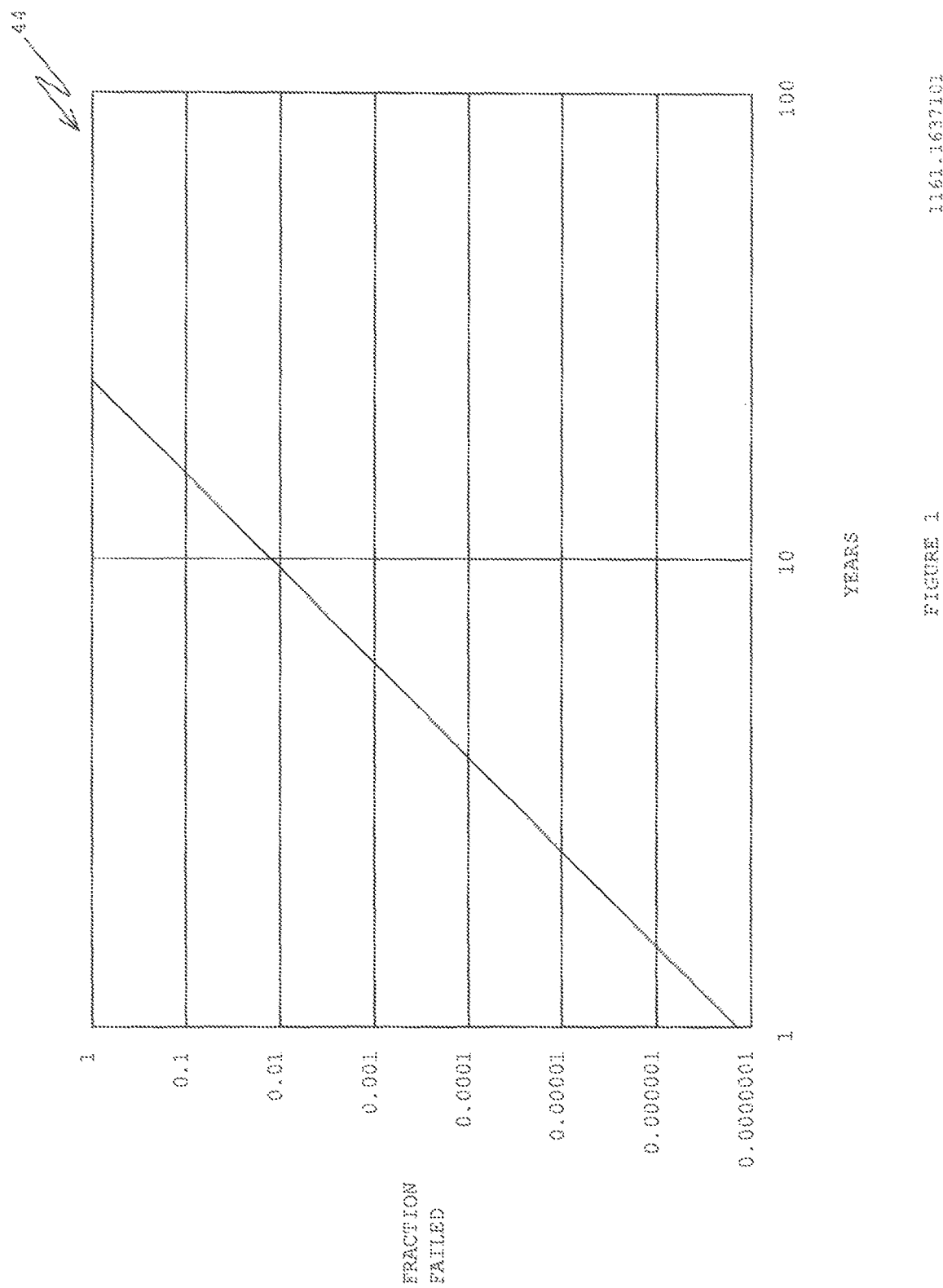
FIG. 1 is a diagram of a graph showing an illustrative example of capacitance reduction versus lifetime in years.

The capacitor may initially have more capacitance than needed for storing the predetermined amount of energy since the capacitance of the capacitor may decrease over time. FIG. 1 is a diagram of a log-log graph 44 showing an illustrative example of capacitance reduction in terms of a fraction of the initial capacitance failed versus lifetime of a capacitor in years. Graph 44 may vary from one capacitor to another.

Figure 2:
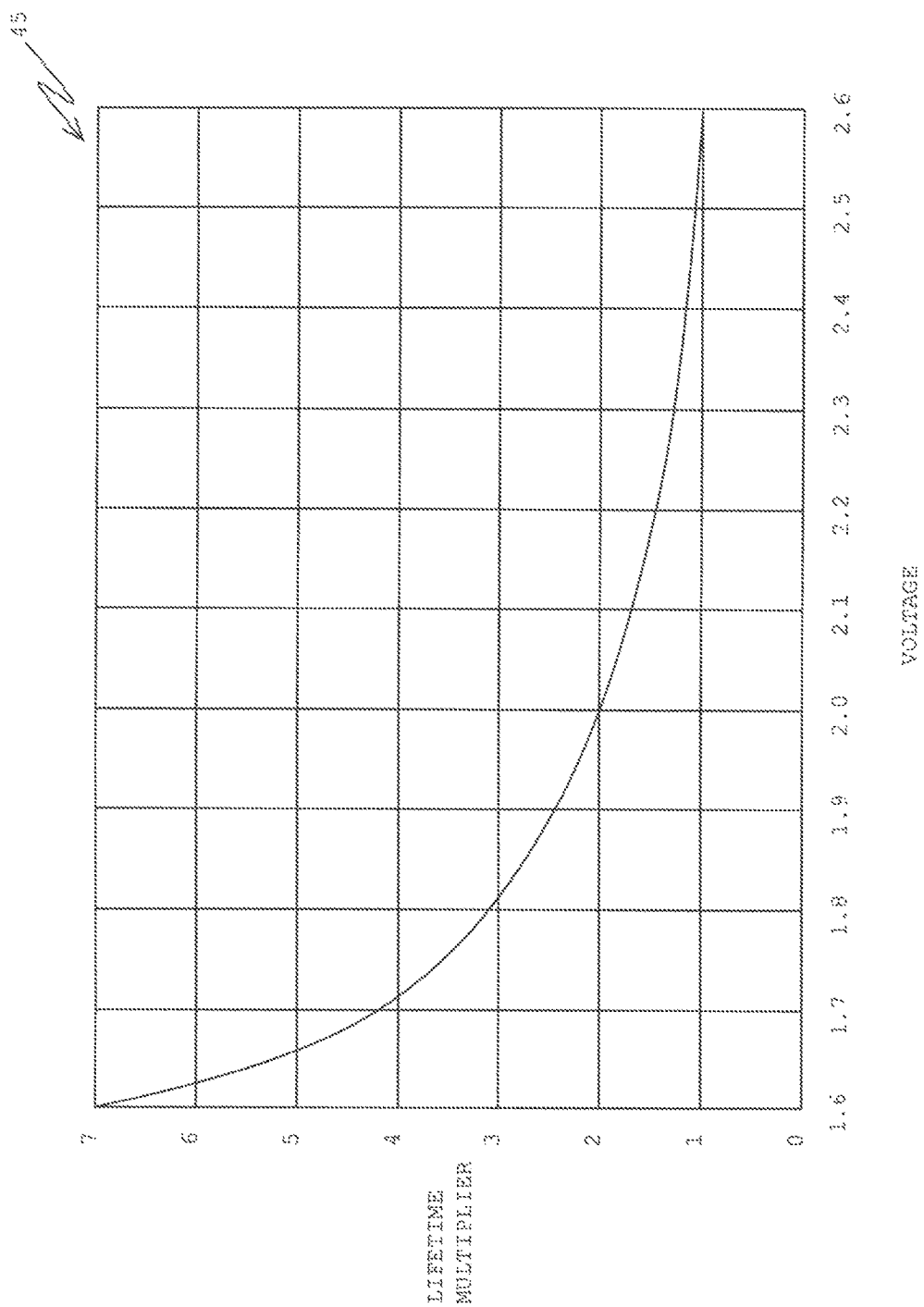
FIG. 2 is a diagram of a graph showing an illustrative example of a capacitor lifetime multiplied versus applied voltage.
Figure 3:
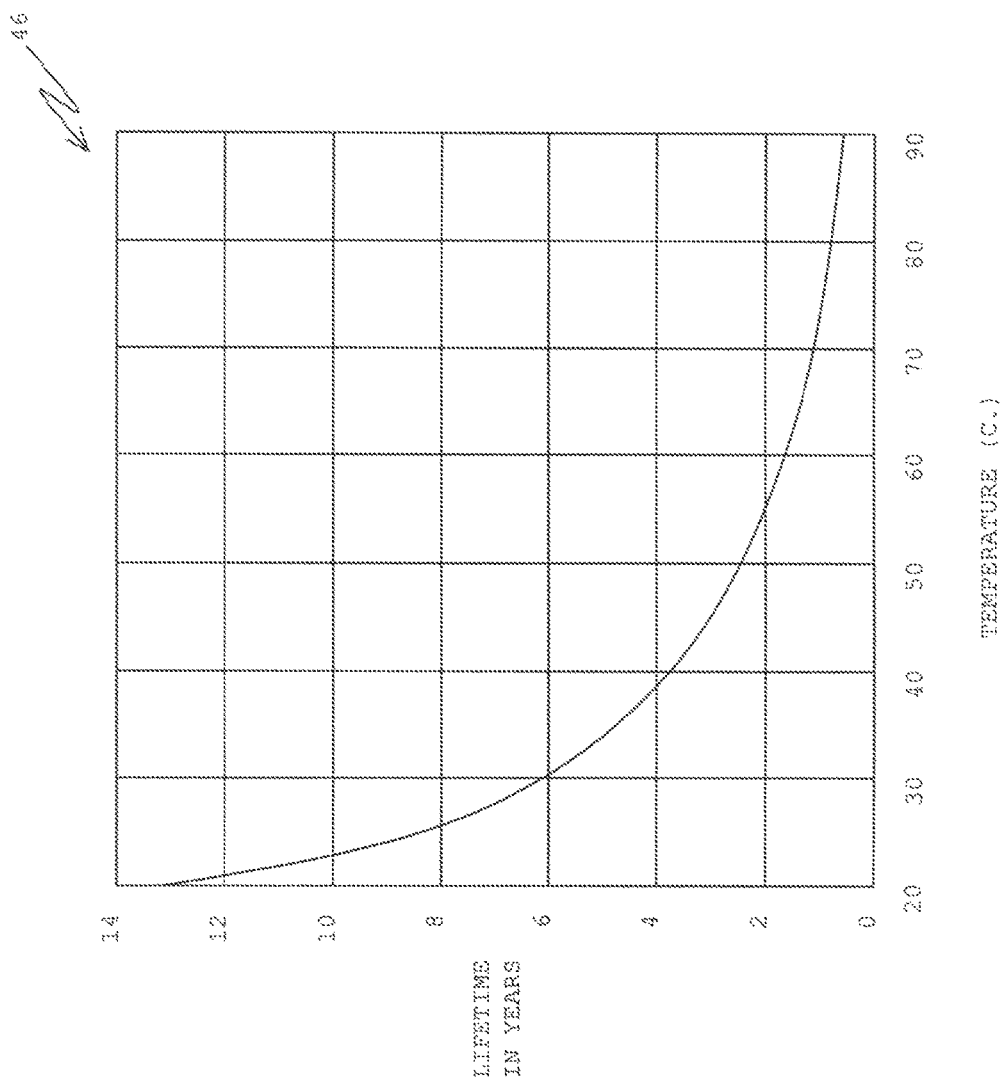
FIG. 3 is a diagram of a graph showing an illustrative example of capacitor lifetime versus operating temperature.

With a capacitor at its initial capacitance, the working voltage may be set as low as possible while still retaining sufficient capacity for storing the predetermined amount of energy. A lower rather than a higher working voltage may extend a service life of the capacitor. FIG. 2 is a diagram of a graph 45 showing an illustrative example of a capacitor lifetime multiplier versus applied voltage. When the working voltage of the capacitor is decreased, the amount of energy that can be stored may decrease, and when the working voltage of the capacitor is increased, the amount of energy that can be stored in the capacitor may increase but should not necessarily be more than the amount of energy that can be stored at the maximum rated voltage of the capacitor as indicated by the manufacturer of the capacitor or determined with capacitor evaluation or tests. The working temperature of the capacitor may also be a factor relative to the lifetime of the capacitor. FIG. 3 is a diagram of a graph 46 showing an illustrative example of capacitor lifetime in years versus temperature in Centigrade. Relative humidity may be recommended to be less than 90 percent.

If the electrical mechanism loses its normal source of power, then a discharge cycle of the capacitor may be initiated to transfer the predetermined amount of energy from the capacitor to the electrical mechanism to put the mechanism in a fail safe condition. If the electrical mechanism has its normal source of power, then a charge cycle of the capacitor may be initiated to transfer energy from the electrical mechanism to the capacitor. A continuous or periodic measurement of virtually instantaneous or present voltage at the capacitor may be taken. A minimal voltage may be the working voltage set as low as possible while still retaining sufficient capacity for storing the predetermined amount of energy. If the present voltage is less than the minimal voltage, then the transfer of energy may continue from the electrical mechanism to the capacitor. If the present voltage is equal to or greater than the minimal voltage, then transfer of energy from the electrical mechanism to the capacitor may be stopped.

A concern about using a super capacitor is that its component lifetime may be strongly affected by working voltage and operational temperature of the super capacitor. (FIGS. 2 and 3.) Higher temperatures and voltages may result in a lower endurance of the super capacitor. An operational temperature profile may be provided for an actuator application. A super capacitor lifetime may be improved by keeping the working voltage as low as possible.

The present approach may involve managing the working voltage of the super capacitor so that there is enough stored energy for fail safe action on one hand, while the working voltage is kept at a minimum on the other hand.

Figure 4:
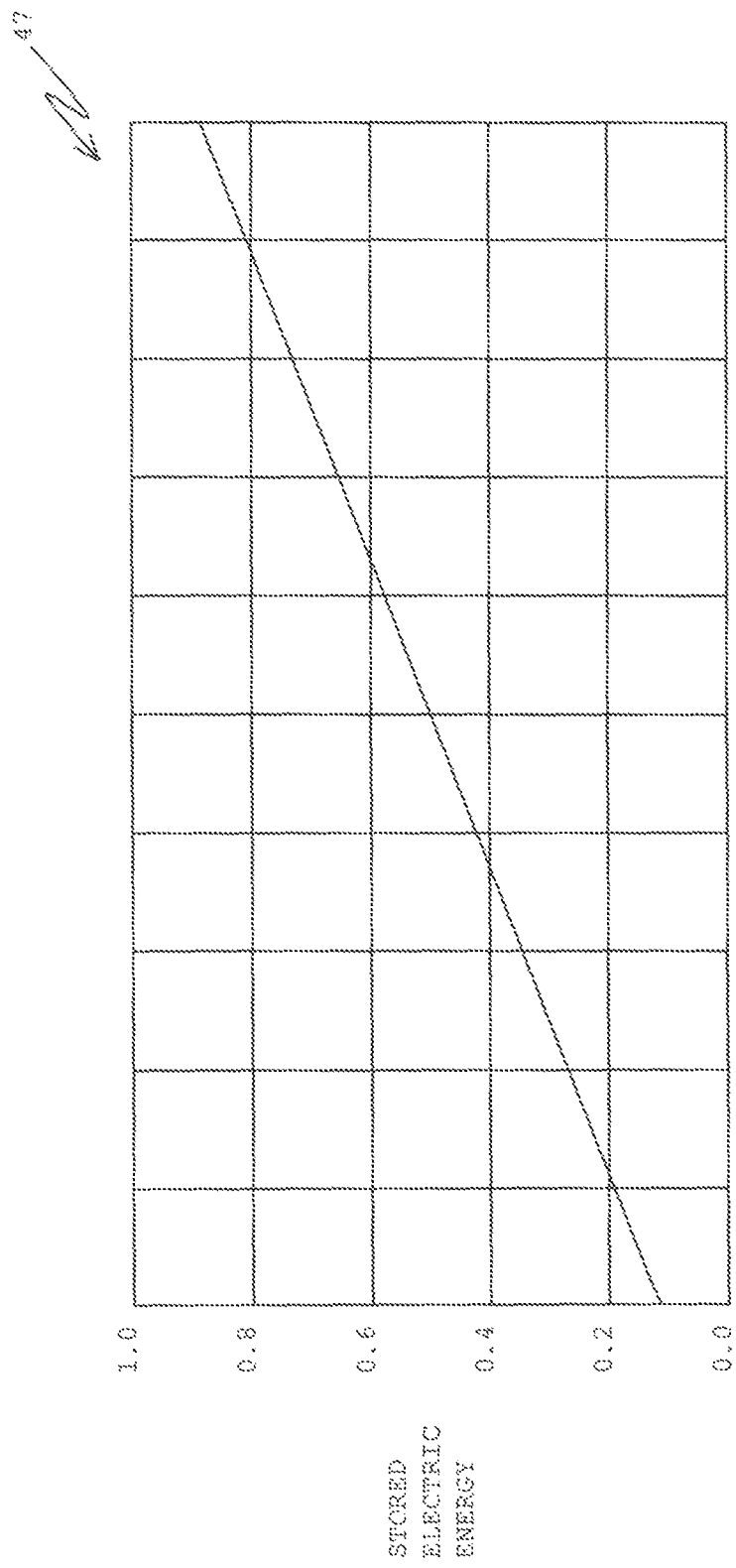
FIG. 4 is a diagram of a graph showing an illustrative example of an amount of stored energy in a capacitor versus a square of applied voltage.

Electric energy stored in a super capacitor may be, for instance, proportional to its capacitance and to a square of the working voltage. FIG. 4 is a diagram of a graph 47 showing an illustrative example of an amount of stored energy in a capacitor versus a square of working or applied voltage. Thus, by controlling the working voltage, the amount of energy stored in the capacitor may be controlled. However, during the super capacitor lifetime, the capacitance of the capacitor may decrease in time because of electrochemical processes within the capacitor. (FIG. 1.) To keep the stored energy level constant, the working voltage may have to be increased accordingly over the duration of a service life of the super capacitor.

At the beginning of the service life, the super capacitor capacitance may be higher. A design should take into consideration that a super capacitor may have a capacitance that may become several tens of percent lower during the service life than its initial capacitance. Therefore, at the beginning of a service life of a super capacitor, its capacitance should be higher than the minimum capacitance needed to hold the required energy for the fail safe action.

The present approach may incorporate monitoring actual properties of the super capacitor in real-time, such as the actual capacitance and internal resistance. For a given application, the required amount of stored energy may be known. Based on these facts, an estimate of a suitable working voltage of the super capacitor, needed for an actuator to perform a fail safe action in case of a power interruption, may be made. The present approach may continuously monitor properties of a super capacitor and accordingly manage its working voltage.

Figure 5:
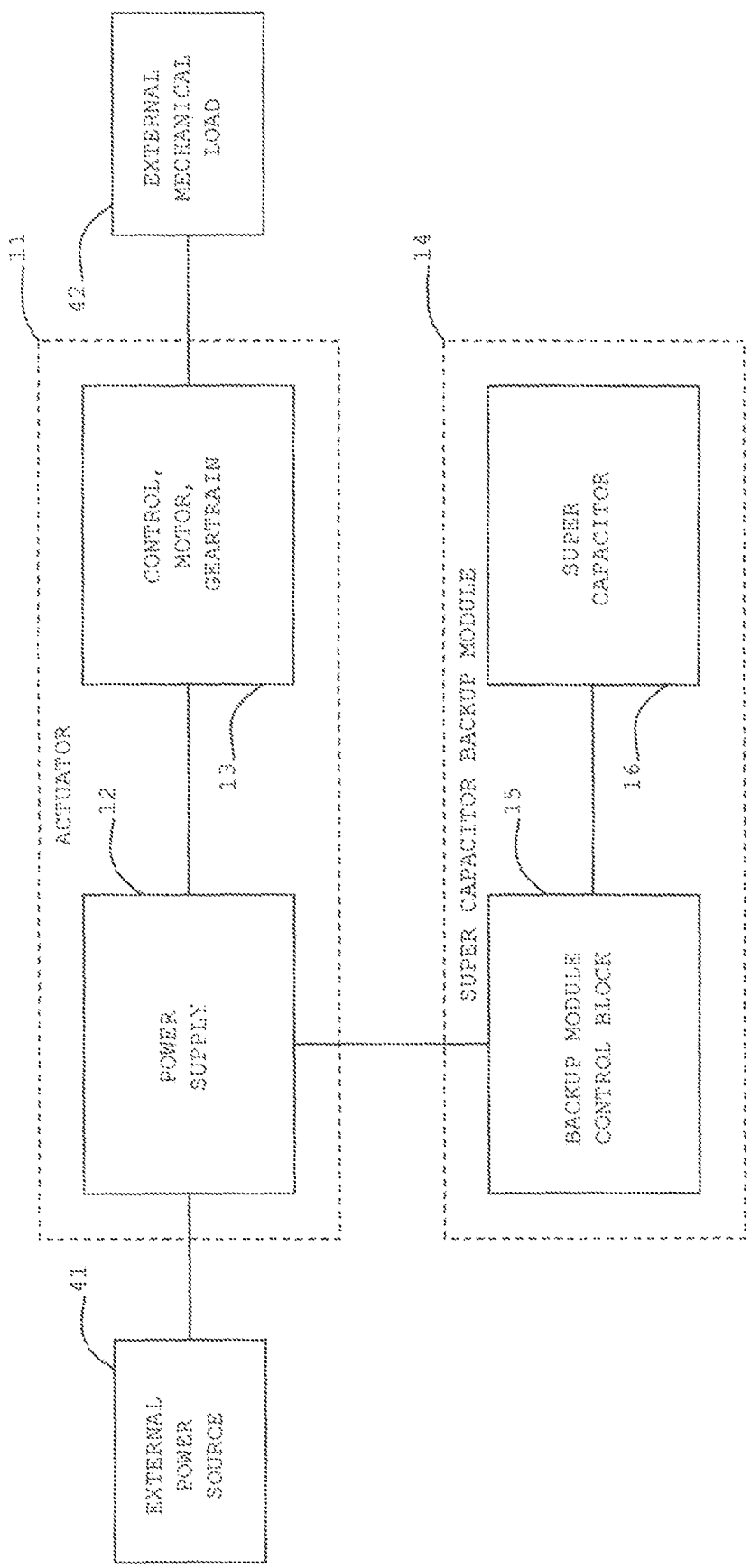
FIG. 5 is a diagram of a capacitor backup system for an electrically powered mechanism.

FIG. 5 is a diagram of an application of the present approach to an electrically powered mechanism such as an actuator 11. A power supply 12 may have an input from an external power source 41 and an output to a controller, motor and gear train module 13. An output of module 13 may drive an external mechanical load 42 such as a flap or valve. A super capacitor backup module 14 may be connected to power supply 12 of actuator 11. Module 14 may have a backup module control block 15 connected to power supply 12. Module 14 may also have a super capacitor 16 connected to module 15. Module 14 may provide a predetermined amount of electrical energy to electrical mechanism or actuator 11 to put the mechanism or actuator 11 into a fail safe condition in an event of power failure to the mechanism or actuator 11.

Figure 6:
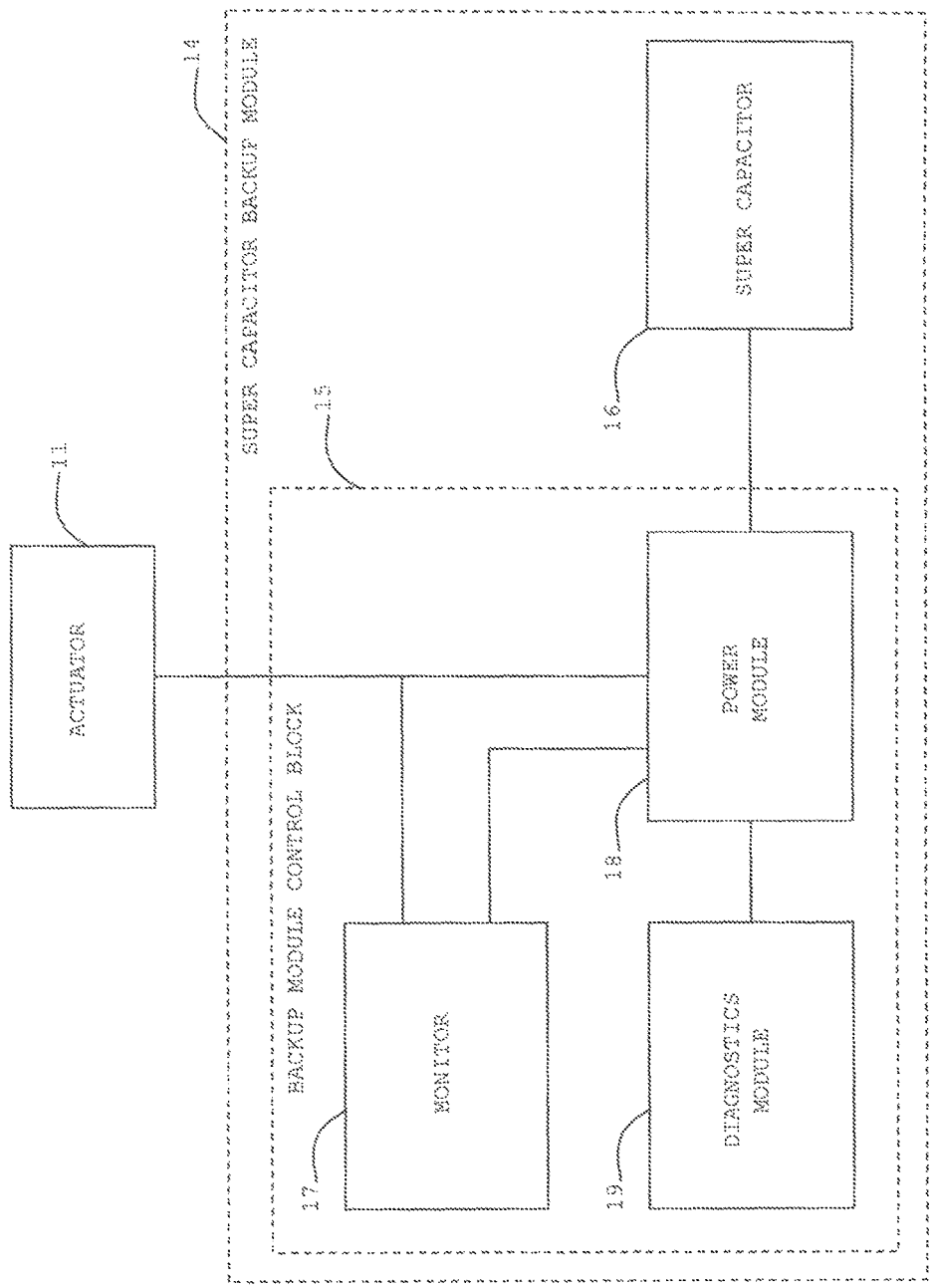
FIG. 6 is a diagram showing details of the capacitor backup module control block.

FIG. 6 is a diagram revealing more detail of the backup module control block 15 of super capacitor backup module 14. A monitor 17 may have an input from a connection between a power module 18 and power supply 12 of actuator 11. An output signal of monitor 17 may go to power module 18. Monitor 17 may provide such things as power off detection. Power module 18 may be connected to super capacitor 16. Power module 18 may control energy or power to and from super capacitor 16, in terms of current control and voltage control, and power from and to actuator 11. The voltage on the connection between super capacitor 16 and module 18 may be designated as "Vc". A diagnostics module 19 may be connected to module 18 and monitor current and voltage at module 18. Module 19 may provide control information and signals to module 18 relative to discharging and charging super capacitor 16. Diagnostic module 19 may determine capacity, ESR and Vc setpoint of super capacitor 16, and other parameters pertinent to the capacitor backup module 14. Module 19 may incorporate a processor and algorithms for determining actual capacitance (C), internal resistance (ESR), minimal amount of voltage (Vcreq) needed to store a predetermined amount of energy (E), setting hysteresis voltage (Vhyst), periodically measuring voltage (Vc) and current (Ic), initiation and stopping of discharge and charge cycles, control of current (Ic) and voltage (Vc) for energy from and to the capacitor. Other items may performed by module 19.

Figure 7:
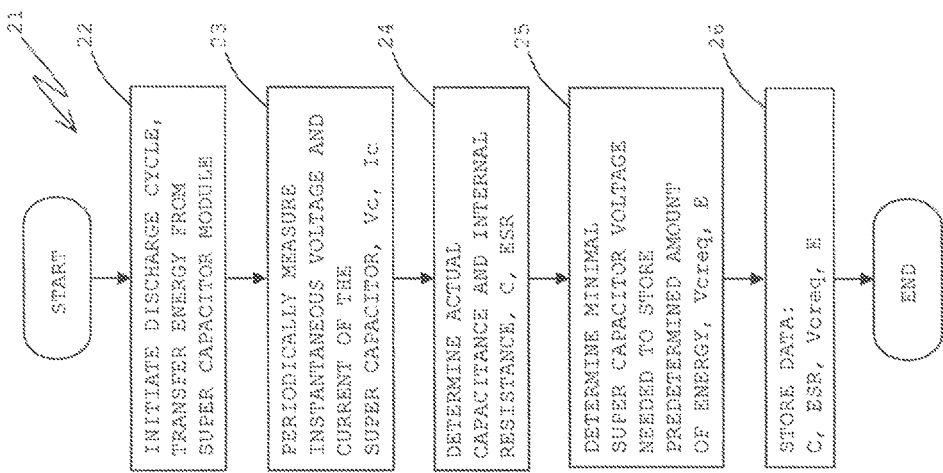

FIGS. 7 and 8 are flow diagrams 21 and 31 of discharge and charge cycles of super capacitor 16. To start in diagram 21, at symbol 22, a discharge cycle may be initiated and energy may be transferred from a super capacitor module. At symbol 23, virtually instantaneous voltage (Vc) and current (Ic) measurements may be continuously or periodically made of the super capacitor. At symbol 24, actual capacitance (C) and internal resistance or equivalent series resistance (ESR) of the super capacitor may be determined. At symbol 25, the minimal voltage (Vcreq) on the super capacitor needed to store a predetermined amount of energy (E) needed for backup may be determined. At symbol 26, data of C, ESR, Vcreq and E may be stored at the end of the discharge cycle.

To start in diagram 31, at symbol 32, a charge cycle may be initiated and energy may be transferred to the super capacitor module. At symbol 33, virtually instantaneous voltage (Vc) and current (Ic) measurements may be continuously or periodically made at the super capacitor. At symbol 34 is a question of whether Vc>=Vcreq+Vhyst or not. If not, then a return to symbol 32 may be made to initiate a charge cycle, transfer energy from a power supply to the super capacitor module and charge the capacitor up to where the capacitor voltage (Vc) is equal or greater than the minimal voltage (Vcreq) plus a hysteresis voltage (Vhyst) needed on the super capacitor to store a predetermined amount of energy (E) as a backup for placing a mechanism in a fail safe condition in case of a power failure to the mechanism. When the capacitor is charged up to a voltage of Vcreq+Vhyst, then the charge cycle may stop. At symbol 33, virtually instantaneous voltage (Vc) and current (Ic) measurements may be continuously or periodically taken at the super capacitor. If Vc>=Vcreq+Vhyst is not true, then there may be a return to symbol 32 for charging as indicated herein. If Vc>=Vcreq+Vhyst, then at symbol 36, the actual capacitance (C) and internal resistance (ESR) of the super capacitor may be determined. At symbol 37, the minimal voltage (Vcreq) on the super capacitor needed to store a predetermined amount of energy (E) for backup may be determined. At symbol 38, data of C, ESR, Vcreq and E may be stored in a memory. Data of Vhyst may also be stored in a memory.

To recap, a system, having a service life extender for a capacitor, may incorporate a power module connected to a capacitor, and a diagnostics module connected to the power module. The diagnostics module may determine a minimum working voltage of the capacitor needed for storing a predetermined amount of energy. The power module may control current and voltage at the capacitor. The predetermined amount of energy may be sufficient for providing a fail safe condition for an electrical mechanism if a power-off condition to the electrical mechanism is detected. If the capacitor is determined to be insufficient to store the predetermined amount of energy at the minimum working voltage, then the minimum working voltage may be increased to provide energy storage sufficient to store the predetermined amount of energy.

The diagnostics module may continuously measure a voltage at the capacitor and determine whether the voltage is equal to or greater than the minimum working voltage needed for storing the predetermined amount of energy. If the voltage is equal to or greater than the minimum working voltage, then a charge cycle is not necessarily needed. If the voltage is less than the minimum working voltage and the power-on condition is detected, then a charge cycle may be initiated and continued until the voltage is equal to or greater than the minimum working voltage plus a hysteresis voltage. If a power-off condition is detected, then a discharge cycle may be initiated and energy may be transferred from the capacitor to an electrical mechanism to provide the fail safe condition for the electrical mechanism.

The system may further incorporate a monitor connected to the power module. The monitor may detect a power-on or power-off condition of the electrical mechanism. The electrical mechanism may be an actuator. The fail safe condition may be a position of a damper or valve controlled by the actuator, placed in a safe power-off position.

The capacitor may have a capacitance of one or more farads. The minimum working voltage of the capacitor, needed to store the predetermined amount of energy, may be increased as necessary to compensate for decreased capacitance of the capacitor due to deterioration.

An approach for expanding a service life of a capacitor, may incorporate providing a capacitor for storing a predetermined amount of energy, providing an electrical mechanism that uses the predetermined amount of energy from the capacitor to achieve a fail safe condition if the mechanism loses power, initiating a discharge cycle of the capacitor to transfer the predetermined amount of energy from the capacitor to the electrical mechanism to achieve the fail safe condition when the mechanism loses power, periodically determining a minimal working voltage of the capacitor needed to store the predetermined amount of energy in the capacitor, and increasing or decreasing the minimal working voltage to be merely sufficient for the capacitor to store the predetermined amount of energy.

The approach may further incorporate initiating a charge cycle of the capacitor to transfer energy from the electrical mechanism to the capacitor as needed to store the predetermined amount of energy when the electrical mechanism has power. The approach may still further incorporate determining the predetermined amount of energy needed to place the electrical mechanism in a fail safe condition if the electrical mechanism loses power. The capacitor may have a capacitance sufficient to store X times the predetermined amount of energy, and $X \geq 1$.

The approach may also further incorporate periodically measuring voltage at the capacitor. If the voltage is less than the minimal working voltage, then transfer energy from the electrical mechanism to the capacitor. If the voltage is equal to or greater than the minimal working voltage plus a hysteresis voltage, then stop transferring energy from the electrical mechanism to the capacitor.

The approach may yet further incorporate determining the normal rated working voltage of the capacitor, and implementing the capacitor at a minimum working voltage that is Y times the normal rated working voltage of the capacitor, where $Y \leq 1$.

The capacitor may be a super capacitor having a value greater than one farad. The electrical mechanism may be an actuator. The fail safe condition may be a position of a damper or valve controlled by the actuator, placed in a safe position.

A capacitive power source, having a service life extending approach, may incorporate a capacitor control block connected to the capacitor module, and a diagnostics module connected to the capacitor control block. The capacitor module may incorporate a capacitor. The capacitor may be operated at a minimum working voltage which is less than a maximum rated working voltage of the capacitor. The capacitor may be an ultra or super capacitor. The diagnostics module may determine the minimum working voltage for storing a predetermined amount of energy. The minimum working voltage of the capacitor may be increased as needed to compensate for decreased energy storage of the capacitor occurring over time. The predetermined amount of energy may be for providing a fail safe condition for an electrical mechanism in an event of a power-off condition of the electrical mechanism.

The capacitor control block may further incorporate a monitor and a power module connected to the diagnostics module. The monitor may provide a signal to the diagnostics module when detecting the power-off condition of the electrical mechanism. The power module may control current and voltage at the capacitor module for providing and/or receiving energy.

The power module may be for receiving and providing energy and be connected to the electrical mechanism. The power module may provide backup energy when the electrical mechanism has a power-off condition, to place the electrical mechanism in a fail safe condition. The electrical mechanism may be an actuator. A fail safe condition may be a safe position of a damper or valve when the actuator has a power-off condition.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A system having a service life extender for a capacitor, comprising:
a power module; and
a diagnostics module connected to the power module; and
wherein:
the diagnostics module is configured to determine a minimum working voltage of a capacitor needed for storing a predetermined amount of energy therein;
the power module is configured to control current and voltage at the capacitor; and
the predetermined amount of energy is sufficient for providing a fail safe condition for an electrical mechanism if a power-off condition to the electrical mechanism is detected; and
the diagnostics module is configured to measures a voltage at the capacitor and determine whether the voltage is equal to or greater than the minimum working voltage needed for storing the predetermined amount of energy;
if the voltage is equal to or greater than the minimum working voltage, then a charge cycle is not needed;
if the voltage is less than the minimum working voltage and the power-on condition is detected, then a charge cycle is initiated and continued until the voltage is equal to or greater than the minimum working voltage plus a hysteresis voltage.

2. The system of claim 1, wherein if a power-off condition is detected, then a discharge cycle is initiated and the power module is configured to transfer energy from the capacitor to the electrical mechanism to provide the fail safe condition for the electrical mechanism.

3. The system of claim 1, further comprising:
a monitor connected to the power module; and
wherein:
the monitor detects a power-on or power-off condition of the electrical mechanism.

4. The system of claim 1, wherein:
the electrical mechanism is an actuator; and
the fail safe condition is a position of a damper or valve controlled by the actuator, placed in a safe power-off position.

5. The system of claim 1, wherein the power module is configured to interact with a capacitor that has a capacitance of one or more farads.

6. The system of claim 1, wherein power module is configured to increase the minimum working voltage of the capacitor, needed to store the predetermined amount of energy, as necessary to compensate for decreased capacitance of the capacitor due to deterioration.

7. A method for expanding a service life of a capacitor for storing a predetermined amount of energy needed by an electrical mechanism to achieve a fail safe condition if the mechanism loses power, comprising:
periodically determining a minimal working voltage of a capacitor needed to store a predetermined amount of energy in the capacitor; and
increasing or decreasing the minimal working voltage to be merely sufficient for the capacitor to store the predetermined amount of energy; and
wherein the capacitor has a capacitance sufficient to store X times, where X>1, the predetermined amount of energy; and
initiating a discharge cycle of the capacitor to transfer the predetermined amount of energy from the capacitor to an electrical mechanism to achieve a fail safe condition when the electrical mechanism loses power.

8. The method of claim 7, further comprising:
initiating a charge cycle of the capacitor to transfer energy from an electrical mechanism to the capacitor as needed to store the predetermined amount of energy when the electrical mechanism has power.

9. The method of claim 7, further comprising:
determining the predetermined amount of energy, wherein the predetermined amount of energy is the amount of energy needed to place an electrical mechanism in a fail safe condition if the electrical mechanism loses power.

10. The method of claim 9, further comprising:
periodically measuring voltage at the capacitor; and
wherein:
if the voltage is less than the minimal working voltage, then transfer energy from the electrical mechanism to the capacitor; and
if the voltage is equal to or greater than the minimal working voltage plus a hysteresis voltage, then stop transferring energy from the electrical mechanism to the capacitor.

11. The method of claim 9, further comprising:
determining a normal rated working voltage of the capacitor; and
implementing the capacitor at a minimum working voltage that is Y times the normal rated working voltage of the capacitor, wherein Y≤1.

12. The method of claim 11, wherein the capacitor is a super capacitor having a value greater than one farad.

13. The method of claim 11, wherein:
the electrical mechanism is an actuator; and
the fail safe condition is a position of a damper or valve controlled by the actuator, placed in a safe position.

14. A capacitive power source having a service life extending approach, comprising:
a capacitor control block connected to the capacitor module; and
a diagnostics module connected to the capacitor control block; and
wherein:
the capacitor module comprises a capacitor;
the diagnostics module determines a minimum working voltage for the capacitor for storing a predetermined amount of energy
the predetermined amount of energy is for providing a fail safe condition for an electrical mechanism in an event of a power-off condition of the electrical mechanism.

15. The system of claim 14, wherein:
the capacitor is operated at the minimum working voltage which is less than a maximum rated working voltage of the capacitor;
the minimum working voltage of the capacitor is increased as needed to compensate for decreased energy storage of the capacitor occurring over time.

16. The system of claim 15, wherein:
the capacitor control block further comprises a monitor and a power module connected to the diagnostics module;
the monitor provides a signal to the diagnostics module when detecting the power-off condition of the electrical mechanism; and
the power module controls current and voltage at the capacitor module for providing and/or receiving energy.

17. The system of claim 16, wherein:
the power module is for receiving and providing energy and is connected to the electrical mechanism; and the power module provides backup energy when the electrical mechanism has a power-off condition to place the electrical mechanism in a fail safe condition.

18. The system of claim 17, wherein:
the electrical mechanism is an actuator; and
the fail safe condition is a safe position of a damper or valve when the actuator has a power-off condition.

19. The system of claim 14, wherein the capacitor is a super capacitor having a capacitance of one or more farads.

* * * * *